US007449088B2

(12) United States Patent
Lausberg et al.

(10) Patent No.: US 7,449,088 B2
(45) Date of Patent: Nov. 11, 2008

(54) PROCESS FOR OBTAINING FATTY ACIDS WITH IMPROVED ODOR, COLOR AND HEAT STABILITY

(75) Inventors: Nataly Lausberg, Duesseldorf (DE); Horst Josten, Duesseldorf (DE); Georg Fieg, Hamburg (DE); Thomas Kapala, Ratingen (DE); Ralf Christoph, Langenfeld (DE); Andreas Suessenbach, Solingen (DE); Andreas Heidbreder, Solingen (DE); Ingomar Mrozek, Duesseldorf (DE); Albrecht Schwerin, Duesseldorf (DE)

(73) Assignee: Cognis Oleochemicals GmbH, Duesseldorf (DE)

( * ) Notice: Subject to any disclaimer, the term of this patent is extended or adjusted under 35 U.S.C. 154(b) by 489 days.

(21) Appl. No.: 11/095,364

(22) Filed: Mar. 31, 2005

(65) Prior Publication Data

US 2006/0006056 A1 Jan. 12, 2006

(30) Foreign Application Priority Data

Mar. 31, 2004 (EP) ................................ 04007768

(51) Int. Cl.
*B01D 3/14* (2006.01)
*B01D 3/38* (2006.01)
*C11B 3/12* (2006.01)
*C11B 3/14* (2006.01)
*B01D 3/42* (2006.01)

(52) U.S. Cl. ............................ 203/73; 203/78; 203/79; 203/80; 203/99; 203/DIG. 19; 554/175

(58) Field of Classification Search ................. 202/154, 202/155, 158, 172; 203/6, 73, 78, 79, 80, 203/99, DIG. 19; 554/175
See application file for complete search history.

(56) References Cited

U.S. PATENT DOCUMENTS

| | | | | | |
|---|---|---|---|---|---|
| 3,402,124 | A | * | 9/1968 | Jones | 208/353 |
| 3,644,179 | A | * | 2/1972 | Knoer et al. | 530/205 |
| 4,415,443 | A | * | 11/1983 | Murphy | 208/355 |
| 4,595,461 | A | | 6/1986 | Jeromin et al. | |
| 4,680,092 | A | * | 7/1987 | Stage | 203/22 |
| 5,973,173 | A | * | 10/1999 | Josten et al. | 554/207 |
| 2003/0116420 | A1 | | 6/2003 | Kalbel et al. | |

FOREIGN PATENT DOCUMENTS

| | | | |
|---|---|---|---|
| DE | 195 31 806 | C1 | 4/1997 |
| EP | 1 321 175 | A2 | 6/2003 |
| WO | WO 96/40851 | A1 | 12/1996 |

* cited by examiner

*Primary Examiner*—Virginia Manoharan
(74) *Attorney, Agent, or Firm*—Smith Moore Leatherwood LLP

(57) ABSTRACT

The present invention relates to a new process for obtaining fatty acids with improved color, odor and heat stability which is characterized in that:

(a) in a first step the crude acids are fed to a rectification ("precut") column in order to remove low boiling by-products being present in the starting material as a top fraction, and (b) in a second step the bottom fraction of the precut column is fed to a sidestream column in order to obtain the pure fatty acids as the side fraction, to remove low boiling by-products which have been formed in the course of the first distillation as a top fraction and to remove high boiling by-products, either being present from the starting material or formed during the first distillation, with the residue.

10 Claims, No Drawings

PROCESS FOR OBTAINING FATTY ACIDS WITH IMPROVED ODOR, COLOR AND HEAT STABILITY

BACKGROUND OF THE INVENTION

The present invention relates to oleochemical raw materials and provides a novel process for obtaining fatty acids with improved quality.

Different approaches to the distillation of fatty acids have been reported in literature and patents and have successfully been practiced in the production scale. The aims of the existing technologies is to separate different kinds of by-products from the fatty acids, namely

- partial glycerides from incomplete fat splitting and other highboilers,
- metals (e.g. from catalysts),
- color bodies and
- odor substances.

In these prior art approaches, highboilers and metals are simply separated by distilling the fatty acids overhead, leaving the higher boiling material as the bottom product. In order to decrease the amount of residue and reduce heat stress for the acids during 25 distillation, technologies have been developed to do the distillation in several steps at different heating temperatures [e.g. U.S. Pat. No. 4,680,092]. To further improve the highboiler separation, the use of structured column packings as a rectifying section has been introduced [U.S. Pat. No. 4,595,461, WO 96/40851 A1].

The separation of color bodies is more complicated as there may be low as well as high boiling substances present. Moreover, there may be color bodies present in the distillation, which were already contained in the raw acid as well as color bodies which are generated due to the heat stress during the distillation. The separation of low boiling color bodies can either be done as a precut in a separate unit before the final distillation or in a single unit operating as a side stream column [DE 19531806 A1]. High boiling color bodies can be separated together with other high boiling products via simple overhead distillation or by the use of structured column packings as a rectifying section.

The situation for odor substances is the same as for low boiling color bodies: They may be either present in the raw material or generated due to heat stress during the distillation. As a result, the separation of odor substances is achieved along with the separation of the lower boiling color bodies either in a precut column or in a sidestream column.

All technologies described above for the separation of low boiling color bodies and odor substances suffer from the disadvantage that they are limited to either an efficient separation of side products that were already present in the raw acid or of those which are generated during the overhead distillation. None of the existing technologies is suitable to solve both separation problems at the same time. While with the precut column technology existing lowboilers can be separated efficiently, additional low-boilers generated during the final distillation are not separated but end up in the final product. The sidestream column is in principle able to separate both existing and generated lowboilers, but with a limited efficiency, because the lowboilers pass through the sidestream on their way up the column and inevitably part of them end up in the sidestream distillate. It was also stated that some of the low boiling color bodies already present in the raw acid form high boiling condensation products in the condenser of the sidestream column. The highboilers formed are passing through the sidestream on their way down the column and part of them will end up in the sidestream distillate too. A slightly improved technology is the sidestream column with a flash unit in front. Part of the lowboilers already present in the raw material are stripped off in a flash unit and are fed to the sidestream column in a section above the side stream withdrawal. As a result, the lowboilers are bypassed around the sidestream point so that they cannot contaminate the sidestream distillate. However this technology still has three disadvantages:

- The concentration of the lowboilers in the flash unit is not very efficient because it provides only one single separation stage.
- Moreover some of the higher boiling components may be flashed off with the precut, are fed to the point above the sidestream and part of them may end up in the sidestream distillate.
- If the above stated effect of highboiler formation as condensation products from the color bodies present in the feed material is valid, this technology doesn't prevent the condensation products from ending up in the sidestream distillate.

Therefore, the problem underlying the present invention has been to develop a new process for obtaining fatty acids with improved color, odor and heat stability predominantly based on crude olein fractions, which is free from the disadvantages cited above.

BRIEF SUMMARY OF THE INVENTION

The present invention provides a new process for obtaining fatty acids with improved color, odor and heat stability which is characterized in that (a) in a first step the crude acids are fed to a precut rectification column in order to remove low boiling by-products being present in the starting material as a top fraction, and (b) in a second step the bottom fraction of the precut rectification column is fed to a sidestream column in order to obtain the pure fatty acids as the side fraction, to remove low boiling by-products which have been formed in the course of the first distillation as a top fraction and to remove high boiling by-products, either being present from the starting material or formed during the first distillation, with the residue.

DETAILED DESCRIPTION OF THE INVENTION

The present invention provides a process for obtaining fatty acids with improved color, odor and heat stability, said process comprising (a) feeding the crude acids into a precut rectification column wherein the low boiling by-products present in the fatty acid starting material are removed as a top fraction and (b) feeding the bottom fraction from the precut rectification column to a sidestream column wherein the low boiling by-products formed in step (a) are removed as a top fraction, the high boiling by-products, either present from the fatty acid starting material or formed during the distillation in step (a), are removed as residue, and the purified fatty acids are removed as the side fraction.

Preferably, the precut rectification column and the side column each comprise a rectifying section and a stripping section. Preferably, the rectifying section and the stripping section comprise structured packings.

The present invention combines the advantages of the various described technologies according to the cited state of the art, but avoids all of its disadvantages. In particular, lowboilers already contained in the raw acids are efficiently separated by the precut column technology, lowboilers which are generated during the overhead distillation are separated with the sidestream column technology, and high boiling condensation products which are formed in the precut column are separated completely as bottom product in the sidestream column.

Fatty Acids

The fatty acids which are used as starting materials according to the inventive process usually follow formula (I)

$$R^1COOH \quad (I)$$

in which $R^1CO$ represents a linear or branched, saturated or unsaturated acyl radical having 6 to 22, preferably 10 to 20 and more preferably 12 to 18 carbon atoms. The acids may be of vegetable or animal origin. Typically, split fatty acids, namely olein fractions of tallow are used which are rich in $C_{12}$ to $C_{18}$ carbon acids, like e.g. lauric acid, myristic acid, palmitic acid, stearic acid, oleic acid, linoleic acid and linolenic acid.

Description of the Process

Low boiling color and odor substances already contained in the raw acids are efficiently separated in a precut column with a rectifying section and a stripping section consisting of structured packing. The structured packing should be chosen from the types of metal sheet packing like Sulzer Mellapack, Montz-Pak, Kuhni Rombopack or the like. The packing height for each of the two column sections should be between 1 and 8 m, preferably between 2 and 4 m. The column should be operated under vacuum at pressures between 1 and 50 mbar, preferably between 5 and 10 mbar. For this purpose the raw acid is preheated and introduced in the middle of the column where it is fed to the upper stripping section. Heat is introduced in a steam heated reboiler which preferably is a falling film evaporator. The lowboilers are condensed in the top condenser, part of the condensate is refluxed to the lower rectifying section of the column and another part is withdrawn from the column as topcut. The amount of topcut should be in the range between 0.1 and 5% of the feed rate, preferably between 0.2 and 1%.

The bottom product from the precut column is fed to a first reboiler loop of a sidestream column (typically, the upper section of the column). The sidestream column serves to efficiently separate highboilers and low boiling color and odor substances which are generated in the reboilers due to the heat stress from the fatty acid end products. The sidestream column is operated under vacuum at a pressure of between 1 to 20 mbar, preferably between 5 and 10 mbar. The vapors generated in the reboiler are passing two sections with structured column packings and are condensed in a first of two condensers. A small amount of the vapors passes the first condenser but is condensed in a second one and taken out of the system as a topcut. This topcut contains in concentrated form the low boiling color and odor substances which were generated in the reboilers due to heat stress of the fatty acids. The amount of topcut should be in the range between 0.1 and 5% of the feed rate, preferably between 0.2 and 1%. The condensate from the first condenser is fed back to the top of the upper packing section, is collected below this section and taken out from the column as a sidestream distillate. A part of this distillate is fed back as reflux to the top of the lower packing section. Highboilers are concentrated via the lower packing section into the bottom residue. The structured packing should be chosen from the types of metal sheet packing like Sulzer Mellapack, Montz-Pak, Kühni Rombopack or the like. The packing height for the two column sections should be between 1 and 8 m, preferably between 2 and 4 m. Heat is introduced into the distillation by two separate reboiler loops operating at different temperatures. Typical product temperatures for both distillation columns are between 180 and 260° C., preferably between 200 and 240° C. in the first reboiler and between 200 and 280° C., preferably between 230 and 260° C. in the second reboiler loop. The reboilers preferably are falling film evaporators. Part of the residue from the first reboiler loop is transferred to the second one by level control. In the second loop the residue is further squeezed out resulting in a concentrated pitch with an acid number of between 10 and 200, preferably between 20 and 80. Typical amounts of pitch are between 1 and 15% of the feed, preferably between 2 and 5%. Superheated stripping steam in an amount between 0 and 10%, preferably between 0.1 and 2% of the product feed rate can be introduced in the second reboiler to reduce distillation temperatures.

EXAMPLES

The invention is illustrated but not limited by the following examples.

Example 1

Evaluation of Color and Odor Generation Due to Heat Stress at Distillation of Raw Tallow Split Fatty Acid Olein Fraction 472 g of raw tallow split fatty acid olein fraction was put into a 1000 ml round bottom flask, heated to 198° C. at a vacuum of 4 mbar. Small amounts of distillate (12.1 g and 19.8 g) were taken off one after another and the samples analysed for Lovibond color and odor (scales from 1: good to 6: very bad):

Sample 1: Lovibond 5¼" yellow 72, red 6.2, odor: 6

Sample 2: Lovibond 5¼" yellow 17, red 1.6, odor: 3

The pressure in the flask was then increased to 100 mbar and the remaining product in the flask heated to 250° C. for 30 min. This treatment should simulate the temperature/time conditions in a typical production scale fatty acid distillation. After that the temperature was reduced to 200° C., the pressure reduced to 9 mbar and again two small samples (19.4 g and 18.8 g) were distilled over. The color and odor evaluation gave the following results:

Sample 3: Lovibond 5¼" yellow 9.6, red 1.0, odor: 4

Sample 4: Lovibond 5¼" yellow 3.7, red 0.4, odor: 1

The example shows that no additional color bodies were formed under heat stress, but that additional odors were generated at higher temperatures.

Example 2

Evaluation of Color and Odor Generation Due to Heat Stress at Distillation of Distilled Tallow Split Fatty Acid Olein Fraction 460.1 g of distilled tallow fatty acid olein fraction was put into a 1000 ml round bottom flask, heated to 198° C. at a vacuum of 9 mbar. Small amounts of distillate (3.1 g and 9.4 g) were taken off one after another and the samples analysed for Lovibond color and odor:

Sample 1: Lovibond 5¼" yellow 6.3, red 0.8, odor: 2

Sample 2: Lovibond 5¼" yellow 3.5, red 0.4, odor: 2

The pressure in the flask was then increased to 100 mbar and the remaining product in the flask heated to 247° C. for 30 min. This treatment should simulate the temperature/time conditions in a typical production scale fatty acid distillation. After that the temperature was reduced to 200° C., the pressure reduced to 12 mbar and again two small samples (5.2 g and 10.1 g) were distilled over. The color and odor evaluation gave the following results:

Sample 3: Lovibond 5¼" yellow 3.3, red 0.4, odor: 3

Sample 4: Lovibond 5¼" yellow 2.1, red 0.2, odor: 1

The example shows that no additional color bodies were formed under heat stress, but that additional odors were generated at higher temperatures.

Example 3

Evaluation of Highboiler Formation in Distillation Topcut of Tallow Split Fatty Acid Olein Fraction 450.3 g of topcut from distillation of tallow split fatty acid olein fraction was put into a 1000 ml round bottom flask and heated to 180° C. for 30 min. The same procedure was applied to a second sample of 448.4 g under a nitrogen sparge. Molecular weight distributions were measured by GPC for samples before and after heat treatment with the results as shown in table 1:

TABLE 1

Compositions (Samples taken after 30 min, 180° C. without nitrogen)

| Topcut | | Sample 1 | | Sample 2 | |
|---|---|---|---|---|---|
| MW | % of mixture | MW | % of mixture | MW | % of mixture |
| 616 | 6.0 | 637 | 14.4 | 641 | 14.0 |
| 421 | 11.8 | 422 | 14.2 | 422 | 13.5 |
| 270 | 14.2 | 271 | 14.7 | 270 | 13.3 |
| 257 | 7.2 | 253 | 6.3 | 253 | 7.1 |
| 228 | 6.8 | 225 | 5.7 | 221 | 4.6 |
| 177 | 26.0 | 176 | 29.0 | 176 | 15.4 |
| 156 | 10.8 | 109 | 5.2 | 153 | 10.5 |
| 109 | 6.3 | 91 | 2.7 | 11 | 5.0 |
| 84 | 2.8 | 63 | 2.1 | 83 | 2.9 |
| 63 | 2.6 | 54 | 1.0 | 66 | 1.6 |
| <63 | ad 100 | 36 | 1.1 | 49 | 2.2 |
| | | <36 | ad 100 | <49 | ad 100 |

The results clearly show, that about 10% additional higher boiling material had formed during the heat treatment regardless if the sample was nitrogen sparged or not.

Inventive Example 1

Distillation of Raw Tallow Split Fatty Acid Olein Fraction in a Sidestream Column Raw, dried tallow split fatty acid olein fraction was distilled in a 50 mm glass fractionation column with 2 m Sulzer BX packing in two sections, a hot oil heated falling film evaporator as reboiler, condenser and vacuum pump. The feed was continuously fed to the reboiler loop. The distillate vapors were condensed in a partial condenser, refluxed to the column top and the final distillate taken out of the column as sidestream below the upper packing section. Part of the sidestream product was refluxed to the lower packing section by using a stream splitting unit. A small topcut was discharged via a second condenser and a residue taken out from the reboiler loop. The following distillation parameters were adjusted: Vacuum: 1 mbar, feed rate: 2150 g/h, topcut: traces, residue: 280 g/h (acid value: 78), distillate rate: 1870 g/h, re flux ratio (reflux/sidestream): ⅕, reboiler temperature: 250° C. The resulting sidestream product had a good smell and the following colors (Lovibond 5¼")

immediately: yellow 12.0, red 1.9 after seven days: yellow 14.2, red 2.1

Comparative Example C1

Distillation of Raw Tallow Split Fatty Acid Olein Fraction with Precut Column+Overhead Distillation Raw, dried tallow split fatty acid olein fraction was distilled in two steps in the same column like in example 4. In the first step the product was fed in the middle of the column to the top of the lower packing. A small topcut was taken and the bottom product was collected for the second distillation step. In the second step the bottom product from the first step was fed to the reboiler loop, a residue was taken from the column bottom and the distillate vapors condensed completely in the top condenser. Part of the distillate was refluxed to the top of the upper column section. The following distillation parameters were adjusted:

Step 1: Vacuum: 1 mbar, feed rate: 7500 g/h, Topcut: 74 g/h, bottom product: 7426 g/h, reflux ratio (reflux/topcut: 10/1, reboiler temperature: 228° C.

Step 2: Vacuum: 1 mbar, feed rate: 2000 g/h, residue: 290 g/h (acid value: 83.5), distillate rate: 1710 g/h, reflux ratio (reflux/distillate): ⅕, reboiler temperature: 256° C.

The resulting distillate had a worse smell than the sidestream product from Inventive Example 1 but the following improved colors (Lovibond 5¼")

immediately: yellow 5.9, red 1.1 after seven days: yellow 8.3, red 1.4

Inventive Example 2

Distillation of Raw Tallow Split Fatty Acid Olein Fraction with Precut Column+Sidestream Column Raw, dried tallow split fatty acid olein fraction was distilled in two steps in the same column like in example 4. In the first step the product was fed in the middle of the column to the top of the lower packing. A small topcut was taken and the bottom product was collected for the second distillation step. In the second step the bottom product from the first step was continuously fed to the reboiler loop. The distillate vapors were condensed in a partial condenser, refluxed to the column top and the final distillate taken out of the column as sidestream below the upper packing section. Part of the sidestream product was refluxed to the lower packing section by using a stream splitting unit. A small topcut was discharged via a second condenser and a residue taken out from the reboiler loop. The following distillation parameters were adjusted:

Step 1: Vacuum: 1 mbar, feed rate: 7500 g/h, Topcut: 74 g/h, bottom product: 7426 g/h, reflux ratio (reflux/topcut: 10/1, reboiler temperature: 228° C.

Step 2: Vacuum: 1 mbar, feed rate: 1750 g/h, topcut: traces, residue: 230 g/h (acid value: 78), distillate rate: 1520 g/h, reflux ratio (reflux/sidestream: ¼, reboiler temperature: 254° C.

The resulting sidestream product had a better smell than the distillate from Comparative Example C1, was comparable in odor quality to the sidestream product from Inventive Example 1 and had the following colors (Lovibond 5¼")

immediately: yellow 9.2, red 1.8 after seven days: yellow 9.0, red 1.1

Comparative Example C2

Production Scale Distillation of Raw Tallow Split Fatty Acid Olein Fraction with Precut Column+Overhead Distillation Raw tallow split fatty acid olein fraction was distilled in two steps in two different production scale fractionation columns. The first column was equipped with 13.8 m structured packing in three sections, a hot oil heated falling film evaporator as reboiler, condenser and vacuum system. The second column was equipped with 7.2 m structured packing in three sections, two steam heated falling film evaporators as reboilers, partial and total condensers, vacuum system and sidestream withdrawal. The raw product had the following characteristics and composition:

- acid value: 189.7
- saponification value: 199.4
- Iodine value: 95
- Pour point: 4.0° C.
- unsaponifiable value: 2.2
- composition [%]: <C12: 0.3; C12: 0.4; C14: 2.1; C14': 0.6; C15: 0.5; C16: 4.9; C16': 5.2; C17: 1.4; C18: 1.7; C18': 65.7; C18'': 13.6; C18''': 1.5; >C18: 2.1

In the first distillation step the product was dried and then fed in the middle of the first colum to the top of the lower packing. A small topcut was taken and the bottom product was collected for the second distillation step in a tank. In the second distillation step the bottom product from the first step was fed to the first falling film evaporator of the second column, part of the bottom product was fed to the second falling film reboiler loop and a residue taken from the second reboiler loop. The distillate vapors were condensed in the top condenser and a small topcut taken via a second condenser. Part of the distillate was refluxed to the top of the upper column section. To support the distillation, superheated 4 bar steam was fed to the second falling film reboiler. The following distillation parameters were adjusted:

- Step 1: Top pressure: 10 mbar, bottom pressure: 16.4 mbar, feed rate after drier: 3400 kg/h, Topcut: 52.3 kg/h, bottom product: 3347.7 kg/h, reflux ratio (reflux/topcut: 16.9/1, reboiler temperature: 226.4° C.
- Step 2: Top pressure: 6 mbar, bottom pressure: 11.4 mbar, feed rate: 2800 kg/h, residue: 357 kg/h (acid value: 35), topcut: 7.0 kg/h, distillate rate: 2436 kg/h, reflux ratio (reflux/distillate): 0.36/1, 1st reboiler temperature: 246.7, 2nd reboiler temperature: 254.6° C., stripping steam rate: 15.3 kg/h.

The resulting distillate had a burned smell and the following characteristic numbers:

- color (Lovibond 5¼")
  - immediately: yellow 3.6, red 0.5
  - after seven days: yellow 4.7, red 0.6
  - heat stability (1 hour 205° C. under $N_2$), immediately: yellow: 11.0, red: 1.8
  - heat stability (1 hour 205° C. under $N_2$), after seven days: yellow: 45.0, red: 5.4
- acid value: 201.0
- saponification value: 21.3
- iodine value: 94.1
- pour point: 8.0° C.
- unsaponifiable value: 1.2
- composition [%]: <C12: 0.0; C12: 0.1; C14: 1.1; C14': 0.3; C15: 0.5; C16: 5.0; C16': 5.4; C17: 1.4; C18: 1.7; C18': 67.0; C18'': 13.6; C18''': 1.5; >C18: 1.9

Inventive Example 3

Production Scale Distillation of Raw Tallow Split Fatty Acid Olein Fraction with Precut Column+Sidestream Column Raw tallow split fatty acid olein fraction was distilled in two steps in two different production scale fractionation columns according to Comparative Example C2. The feed material was the same as in Comparative Example C2. In the first distillation step, the product was dried and then fed in the middle of the first column to the top of the lower packing. A small topcut was taken and the bottom product was collected for the second distillation step in a tank. In the second distillation step, the bottom product from the first step was fed to the first falling film evaporator of the second column, part of the bottom product was fed to the second falling film reboiler loop and a residue taken from the second reboiler loop. The distillate vapors were condensed partly in the partial condenser and a small topcut was taken via the second condenser. The condensate from the first condenser was completely refluxed to the top of the upper column section. Below the upper packing the liquid was collected and part of it taken out as the final distillate. Another part of the sidestream product was refluxed to the second packing section for highboiler concentration. To support the distillation, superheated 4 bar steam was fed to the second falling film reboiler. The following distillation parameters were adjusted:

- Step 1: Top pressure: 10 mbar, bottom pressure: 16.4 mbar, feed rate after drier: 3400 kg/h, Topcut: 52.3 kg/h, bottom product: 3347.7 kg/h, reflux ratio (reflux/topcut: 16.9/1, reboiler temperature: 226.4° C.
- Step 2: Top pressure: 6 mbar, bottom pressure: 10.5 mbar, feed rate: 2800 kg/h, residue: 343 kg/h (acid value: 35), topcut: 9.0 kg/h, distillate rate: 2448 kg/h, reflux ratio (reflux/sidestream): 0.36/1, 1st reboiler temperature: 244.2, 2nd reboiler temperature: 247.3° C. Stripping steam rate: 14.8 kg/h.

The resulting sidestream distillate had a much better smell than the distillate from Comparative Example C2 and the following characteristic numbers:

- color (Lovibond 5¼")
  - immediately: yellow 4.0, red 0.6
  - after seven days: yellow 5.1, red 0.7
  - heat stability (1 hour 205° C. under $N_2$), immediately: yellow: 10.0, red: 1.7
  - heat stability (1 hour 205° C. under $N_2$), after seven days: yellow: 65.0, red: 7.9.
- acid value: 199.7
- saponification value: 200.6
- iodine value: 98.9
- pour point: 8.0° C.
- unsaponifiable value: 0.9
- composition [%]: <C12: 0.0; C12: 0.0; C14: 0.2; C14': 0.1; C15: 0.2; C16: 5.7; C16': 5.3; C17: 1.7; C18: 1.6; C18': 67.4; C18'': 13.7; C18''': 1.5; >C18: 2.0

What claimed is:

1. A process for obtaining fatty acids with improved color, odor and heat stability said process comprising (a) feeding crude acids into a precut rectification column wherein low boiling by-products present in the crude acids are removed as a top fraction and (b) feeding a bottom fraction from the precut rectification column to a sidestream column wherein low boiling by-products, which are formed in step (a), are removed as a top fraction, high boiling by-products, either present from the crude acids or formed during distillation in step (a), are removed as residue, and purified fatty acids are removed as a side fraction.

2. The process according to claim 1, wherein the crude acids comprise at least one fatty acid of formula (I)

$$R^1COOH \quad (I)$$

in which $R^1CO$ represents a linear or branched, saturated or unsaturated acyl radical having 6 to 22 carbon atoms.

3. The process according to claim 1, wherein the columns are operated independently from each other at temperatures of from 180 to 260° C.

4. The process according to claim 1 wherein the precut column is operated at a reduced pressure of from 1 to 50 mbar.

5. The process according to claim 1, wherein the sidestream column is operated at a reduced pressure of from 1 to 20 mbar.

6. The process according to claim 1, wherein the precut rectification column and the sidestream column each comprise a rectifying section and a stripping section.

7. The process according to claim 6, wherein the rectifying section and the stripping section comprise structured packings.

8. The process according to claim 7, wherein at least each section of said structured packings has an altitude of 1 to 8 m.

9. The process according to claim 6, wherein condensate is formed in each of the two columns and a part of each of the condensates of the two columns is refluxed to the rectifying sections.

10. The process according to claim 6, wherein superheated steam is fed to the sidestream column in order to decrease the distillation temperature.

* * * * *